United States Patent [19]

Rogers

[11] 4,236,854
[45] Dec. 2, 1980

[54] PORTABLE CARGO BRACE

[76] Inventor: Robert Rogers, 13204 Bellevue St., Silver Spring, Md. 20904

[21] Appl. No.: 897,484

[22] Filed: Apr. 18, 1978

[51] Int. Cl.³ .................. B60P 7/08; B61D 45/00; B65J 1/24
[52] U.S. Cl. .................................. 410/121; 410/129; 410/140; 410/143; 410/151
[58] Field of Search .............. 105/463, 486, 489, 493, 105/497, 498, 499, 502, 503; 280/179 A, 179 B, 179 R; 410/121, 129, 14 D, 143, 27, 151

[56] References Cited

U.S. PATENT DOCUMENTS

| 2,519,846 | 8/1950 | Nampa | 105/502 |
|---|---|---|---|
| 2,575,751 | 11/1951 | Donnelley | 105/502 X |
| 2,613,615 | 10/1952 | Nampa | 105/502 |
| 2,629,607 | 2/1953 | Roubeck | 280/179 R X |
| 2,679,214 | 5/1954 | Nampa | 105/502 |
| 3,051,099 | 8/1962 | Robertson | 105/503 X |
| 3,074,740 | 1/1963 | Zastrou | 410/151 |
| 3,110,506 | 11/1963 | O'Brien | 410/151 |
| 3,199,464 | 8/1965 | Shook | 105/463 |
| 3,677,562 | 7/1972 | Bronstein | 280/179 A |
| 3,891,102 | 6/1975 | Blount | 410/27 X |
| 3,912,139 | 10/1975 | Bowman | 105/497 X |
| 3,995,565 | 12/1976 | Kersey | 410/151 |

FOREIGN PATENT DOCUMENTS

| 2657539 | 6/1978 | Fed. Rep. of Germany | 280/179 R |
| 2701786 | 7/1978 | Fed. Rep. of Germany | 280/179 R |

Primary Examiner—Howard Beltran
Attorney, Agent, or Firm—Fisher, Christen & Sabol

[57] ABSTRACT

This invention relates to a brace for less than full load cargo in trucks, vans or other vehicles. It effectively prevents the cargo from shifting around in the vehicles, while at the same time it is easily removable and readily collapsible into a relatively small package for easy carrying and storage. Longitudinal side rails and lateral arms are extensible via a ratchet mechanism to fit any size cargo area. Similarly, the height of the brace is adjustable by varying the length of the legs which bear upon the cargo area floor. The use of legs to support the cargo brace eliminates the need for any springs in the side rails and lateral arms, thereby preventing them from damaging the vehicle walls and enabling it to be easily removed. Although designed and intended specifically for use in pick-up trucks of all dimensions, the cargo brace may also be used in boats, airplanes, trains or any other cargo transporting device.

12 Claims, 5 Drawing Figures

PORTABLE CARGO BRACE

FIELD OF THE INVENTION

This invention relates to cargo braces, more particularly such braces which are easily removable and collapsible.

BRIEF DESCRIPTION OF THE PRIOR ART

Many devices for preventing the shifting of less than full load cargo have been developed over the years, and cargo braces, per se, are well known in the prior art. Generally, these can be categorized as permanently installed or removable braces. In the permanently installed type, members are permanently attached to the side or end walls of the vehicle and adjustable cross-members are attached thereto. The location of the cross-members varies according to the number and location of articles carried. The permanent type of cargo braces have found their greatest acceptance in railroad freight cars and large trucks since the large, flat wall surfaces provide easy mounting for the permanently attached members. Examples of this type may be found in the following U.S. Pat. Nos.: 2,519,846—Nampa; 2,575,751—Donnelley; 2,613,615—Nampa; 2,679,214—Nampa; 3,051,099—Robertson.

Although such systems function well in large cargo vehicles they are unsuitable for use in light trucks (such as pick-ups, vans, small delivery trucks, etc.), cars (such as station wagons) small boats and private aircraft. The side and end walls of the cargo area of such vehicles do not provide the requisite large, flat mounting area, since such are often interrupted by wheel wells, tailgates, doors, folding seats, etc. This lack of flat surface area prevents the attachment of the permanent members, and, even if they are installed on the remaining flat surface, they do not provide a sufficient area for adjustment of the cross-members. Also, the complexity and resultant cost of such permanent installations renders them unsuitable for use in private vehicles.

The removable cargo braces typically comprise at least one pair of telescoping members with a biasing means, usually a spring, serving to urge the members in opposite directions. Examples of removable cargo braces may be found in the following U.S. Pat. Nos.: 3,074,740—Zastrow; 3,110,506—O'Brien; 3,995,565—Kersey.

The device shown by Kersey (U.S. Pat. No. 3,995,565) uses tension springs to bias the telescoping members into each other and a jacking mechanism to overcome the spring biasing force and move the telescoping members apart. O'Brien (U.S. Pat. No. 3,110,506) uses an over-center toggle mechanism to displace the telescoping members, while Zastrow (U.S. Pat. No. 3,074,740) uses a manually adjustable locking member to adjust the telescoping tubes in the approximate position and a compression spring to achieve the final adjustment.

The primary deficiency of such removable cargo braces is their dependence upon the frictional force between their ends and the walls to both maintain them in position and provide the cargo stabilizing force. The force applied to the cargo load is directly proportional to the force biasing the telescoping members apart. If this biasing force is great enough to stabilize a heavy load, the brace becomes difficult to install and remove, since the biasing force must be overcome to install or remove it. If the biasing force is reduced to permit easy installation, the brace cannot apply the necessary stabilizing force to the cargo. Also, a large biasing force will cause damage to the wall surfaces, an element which is undesirable in a privately owned vehicle that must be used for purposes other than carrying cargo.

Another drawback of the prior art removable devices is that they contact only one side of the cargo. Thus, to prevent the cargo from tipping over or moving, it must be placed against a wall, or two braces must be used, one on each side of the load. This is obviously undesirable since it limits the positions in which the load can be carried or, if two braces are used, doubles the installation time and the brace storage problems. Removable braces shown in the prior art do not provide both lateral and longitudinal bracing for the cargo, thereby requiring additional means to prevent the load from moving.

SUMMARY OF THE INVENTION

This invention relates to a removable, free-standing cargo brace which overcomes the deficiencies of the prior art devices. It is easily installable in any type of cargo carrying vehicle or vessel without damaging the walls thereof, and is readily collapsible into a small, easily storable unit. Since no springs are used, the operator does not have to overcome any spring biasing forces when installing or removing the brace.

The brace according to the invention comprises a pair of side rails each having a pair of telescoping members and a pair of folding lateral members connecting the side rails at each end. The side rails have a ratchet locking device to retain them in their desired extended position and at the same time allowing them to be easily collapsed, if desired. Each of the folding lateral members is adjustable to vary the distance between the side rails to achieve the largest possible cargo bracing area in various size pick-up trucks or other vehicles. Also, lateral extensible arms are slidably mounted on each end of the lateral members to contact the side walls and prevent the brace from moving laterally in the cargo area. Longitudinal movement is prevented by the ends of the side rails which contact the front and back walls.

Extensible legs are pivotably attached to the side rails to support the brace on the cargo area floor. The length of the legs are adjustable via a ratchet mechanism to vary the height of the cargo brace. Since the brace is supported by the legs, the side rails and lateral arms do not have to exert a large force on the side and end walls to retain the brace in position. This prevents damage to the walls and renders the brace easily removable. The legs pivot so as to fold up into the side rails when not in use.

One or more cross-members are attached to each of the side rails to prevent the load from shifting longitudinally. The cross-members are also adjustable to allow the distance between the side rails to be adjusted. The cargo may be retained between a lateral member and a cross-member, or cross-members may be located on either side of numerous cargo items placed within the perimeter of the brace to secure a variety of objects.

To remove the brace from the cargo area, the cross-members are removed and the lateral arms are retracted by releasing their ratchet locks. The side rails are retracted by releasing their ratchet locks, and the legs are retracted and folded into the side rails. The lateral members are folded at their centers to enable the side rails to be brought together. The compact folded brace may be stored, or may be carried in the vehicles for future use.

DETAILED DESCRIPTION OF THE PREFERRED EMBODIMENT

Figure 1:
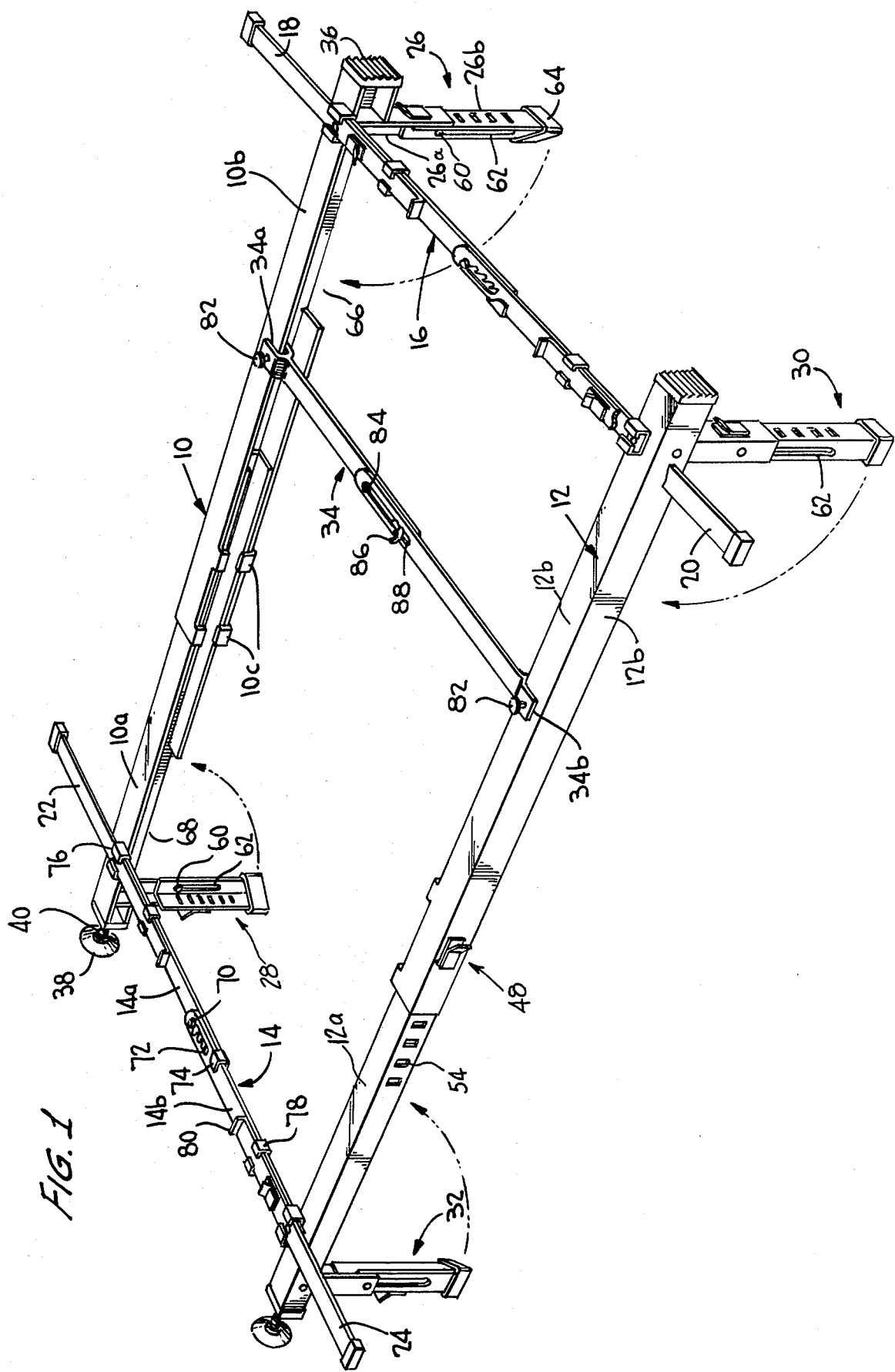
FIG. 1 is a perspective view of a cargo brace according to the present invention.

A cargo brace according to the present invention is shown in FIG. 1 and comprises side rails 10 and 12, folding lateral members 14 and 16 interconnecting the ends of side rails 10 and 12, laterally extensible arms 18, 20, 22 and 24 slidably attached to each end of folding lateral members 14 and 16, extensible folding legs 26, 28, 30 and 32 attached to the ends of side rails 10 and 12, and one or more cross-members 34 removably attached to side rails 10 and 12.

Side rails 10 and 12 are of similar construction and only one need be described in detail. Side rail 10 comprises inner channel 10a and outer channel 10b sized so as to telescopically interfit. Outer channel 10b has tab portions 10c which are bent over and contact inner channel 10a so as to prevent lateral separation of channels 10a and 10b. Thus, inner and outer channels 10a and 10b may only move longitudinally with respect to each other. Bumper pad 36 is attached to one end of outer channel 10b and suction cup 38 is attached to one end of inner channel 10a via threaded bolt 40.

Figure 3:
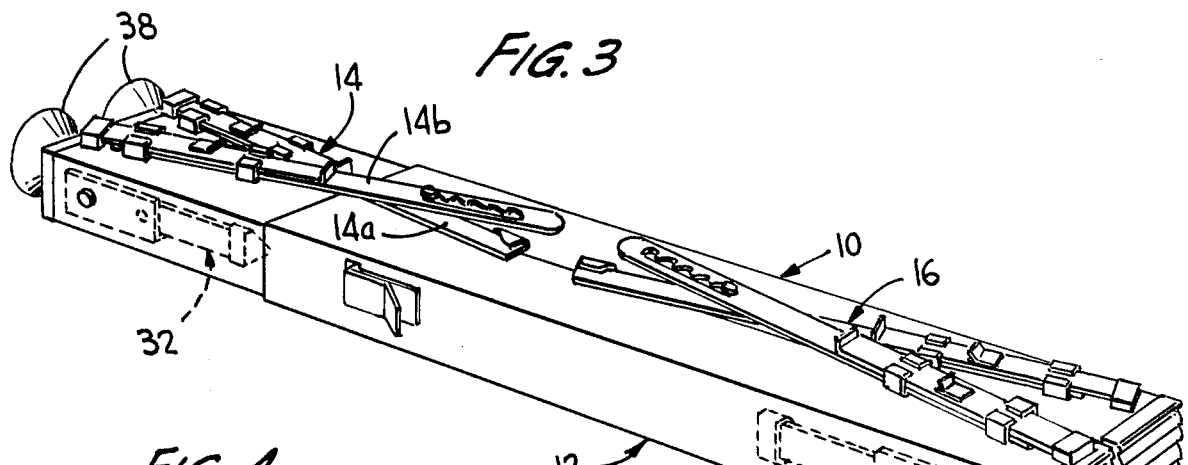
FIG. 3 is a perspective view of the cargo brace of FIG. 1 in its collapsed position.
Figure 4:
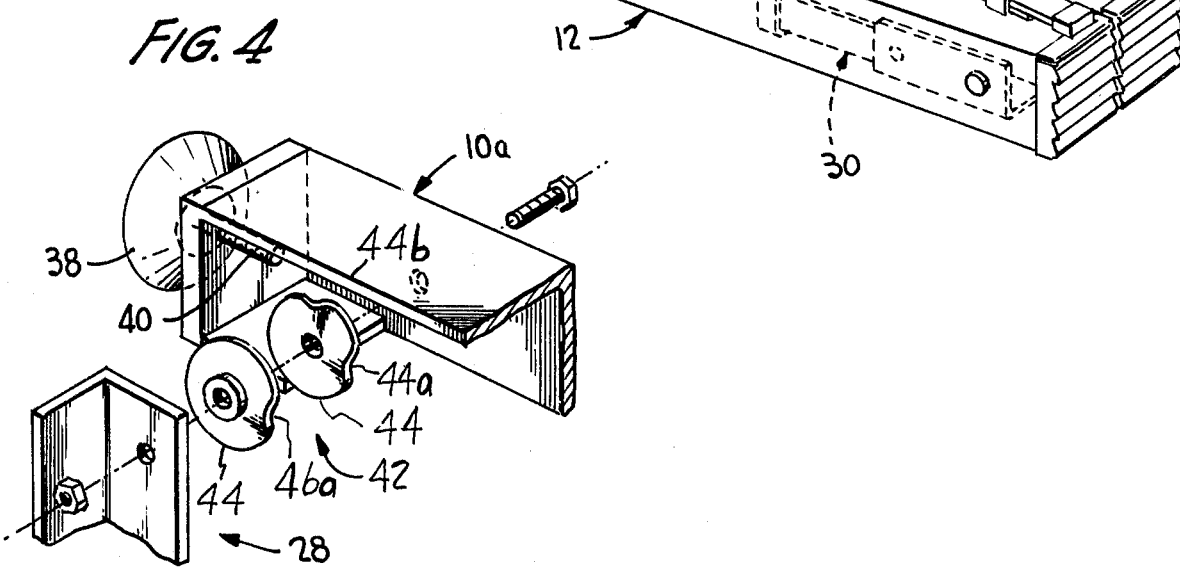
FIG. 4 is an enlarged, detail view of the leg locking mechanism of the cargo brace of FIG. 1.

Legs 26 and 28 are pivotally attached to outer and inner channels 10b and 10a, respectively by washer locking mechanism 42, shown in detail in FIG. 4. Washer 44 is rigidly attached to channel 10a or 10b and is deformed so as to form two radial detent portions 44a and 44b disposed approximately 90° from each other. Washer 46 is attached to leg portion 26a and bears against washer 44. Washer 46 is deformed to form detent portion 46a which engages either detent 44a or 44b. The inter-engaging detent portions serve to lock leg 26 in either a down position, as shown in FIG. 1, or an up position as shown in FIG. 3. Detent 46a engages detent 44a to lock the leg in a down position, and it engages detent 44b to lock the leg in its up position. Washers 44 and 46 are made of a material which will flex slightly to allow detent 46a to move from one position to the other. Although only the mechanism for leg 26 has been described, it is understood that a similar mechanism is used to attach all of the legs to the side rails.

Figure 5:
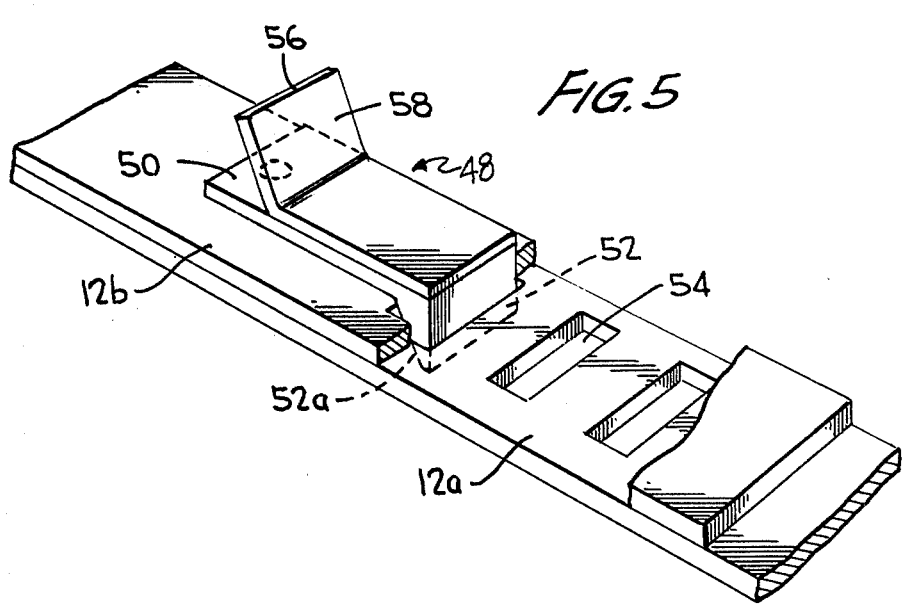
FIG. 5 is an enlarged detail view of the ratchet locking mechanism used on the cargo brace of FIG. 1.

The inner and outer channels are adjusted and locked into the desired position via ratchet mechanism 48, shown in detail in FIG. 5. Mechanism 48 is located on the side of both side rails 10 and 12, although only one will be described in detail. Ratchet mechanism 48 comprises spring member 50 attached at one end to channel 12b, having pawl portion 52 extending through an opening in channel 12b. Pawl portion 52 engages one of a plurality of openings 54 in inner channel 12a and prevents relative movement between inner and outer channels 12a and 12b toward each other. The channels may be moved away from each other due to slanted surface 52a by merely grasping each one and exerting a force in that direction. In order to collapse the inner and outer channels, the distal end of spring member 50 is raised by pressing on the outwardly projecting end 56 of member 58. This withdraws pawl 52 from hole 54 and allows channels 12a and 12b to be readily collapsed.

A similar mechanism is used on side rail 10 to retain channels 10a and 10b in the desired position, and also on each of legs 26, 28, 30 and 32. Leg 26 comprises leg portions 26a and 26b slidably retained together by headed protrusion 60 extending through elongated slot 62 in leg portion 26b. This prevents lateral separation of the leg portions while at the same time allowing relative longitudinal movement. As can be seen in FIG. 1, the ratchet mechanism, as previously described, is attached to leg portion 26a having the pawl portion extending through a hole in this leg portion and engaging one of a plurality of holes through leg portion 26b. The structure and function of the ratchet mechanism is exactly the same as that previously described. Pads 64 may be provided on the end of the legs, if desired. Although only leg 26 has been described in detail, it is to be understood that the remaining legs are of identical construction and, therefore, no detailed description of these are necessary. Channels 10a, 10b, 12a and 12b have a portion of their lower flange cut away, as at 66 and 68 to allow the legs to be folded up into the channels.

Lateral folding member 14 comprises first portion 14a and second portion 14b pivotally attached to side rails 10 and 12, respectively. First and second portions 14a and 14b are joined together by headed peg 70, attached to portion 14a, engaging slot 72 in portion 14b. One side of slot 72 is straight, while the other side has a series of indentations along its length to selectively engage pin 70. This allows the lateral distance between side rails 10 and 12 to be varied by merely placing peg 70 in one of the desired indentations. Retainer 74 is attached to portion 14a and has a generally "U"-shaped cross-section to slidably contact upper and lower surfaces of portion 14b and one edge thereof. Retainer 74 prevents vertical separation between portions 14a and 14b when they are in alignment, while allowing them to pivot about peg 70 to be folded, which will be described hereinafter.

Laterally extensible arms 22 and 24 are slidably retained on portions 14a and 14b by tabs 76 and 78, respectively. Projection 80 extends upwardly and can be manually gripped to move arms 22 and 24 with respect to portions 14a and 14b. A ratchet mechanism, identical to that used on the side rails and the legs, is attached to both extensible arms 22 and 24 such that the pawl extends through holes therein and engages one of a plurality of holes in portions 14a and 14b to lock arms 22 and 24 in position. Although only lateral folding member 14 and laterally extensible arms 22 and 24 and 22 have been described in detail, it is understood that lateral folding member 16 and laterally extensible arms 18 and 20 are identical in both structure and function.

Cross-member 34 has "U"-shaped end portions 34a and 34b which are attached to side rails 10 and 12 via thumbscrews 82 bearing against the upper portion of the side rails. This allows cross-member 34 to be positioned at any location along the length of the side rails. The width is adjustable by peg 84 and thumbscrew 86 sliding in groove 88. Although only one cross-member is shown, obviously any number may be used, depending upon the size, shape and number of articles in the load.

Figure 2:
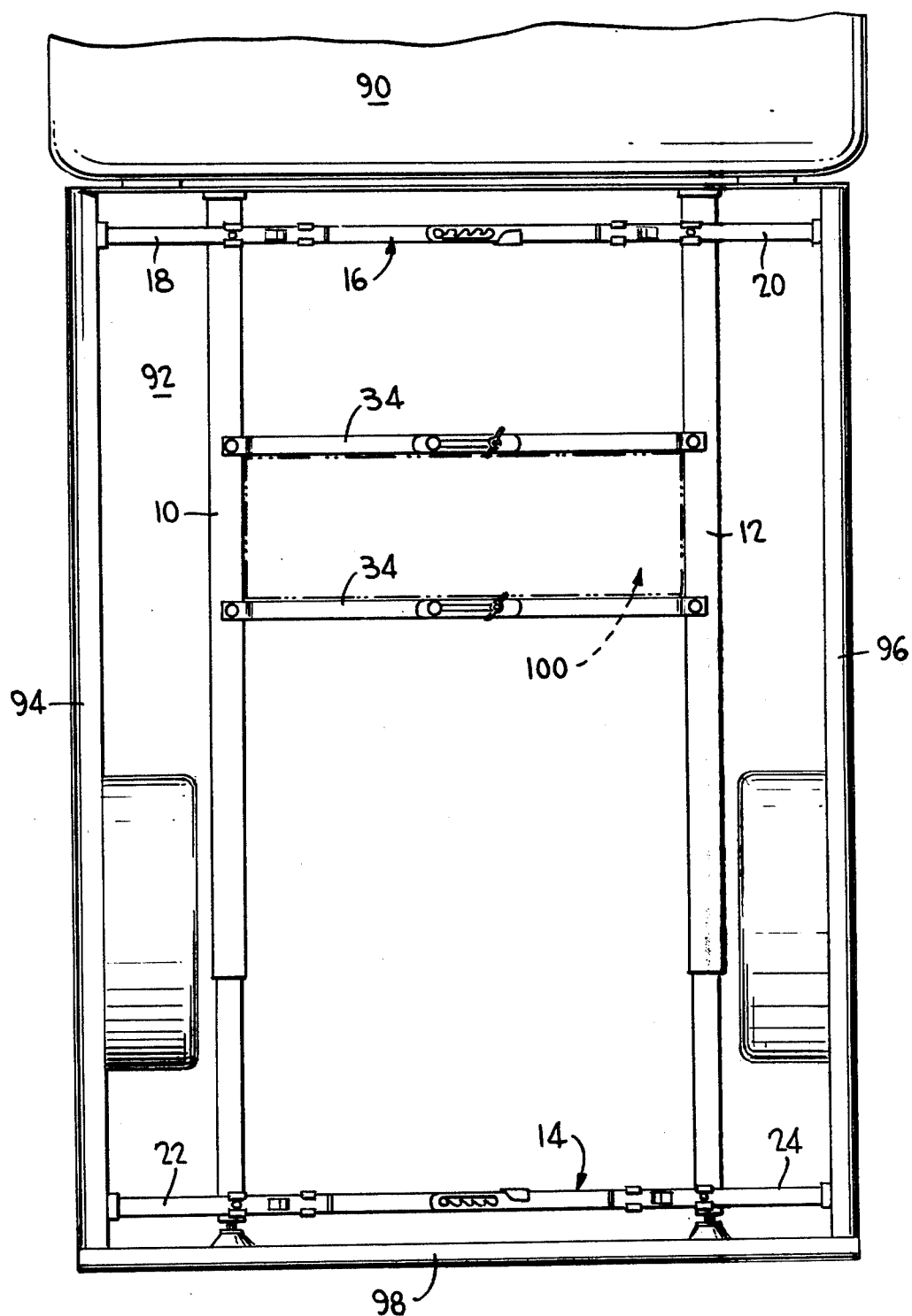
FIG. 2 is a top view of a bed of a pick-up truck showing the cargo brace of FIG. 1 installed.

The cargo brace according to the invention is shown installed in a pick-up truck body in FIG. 2. The showing of a pick-up truck is for illustrative purposes only, and it is understood that the brace may be used in any type of vehicle or vessel. The pick-up truck has cab 90, bed 92, side walls 94 and 96, and tailgate 98. The side rails 10 and 12 are extended to contact the rear of cab 90 and tailgate 98. Arms 18, 20, 22, and 24 are extended laterally to contact side walls 94 and 96. Cargo load 100 is positioned on truck bed 92 and cross-members 34 are attached to side rails 10 and 12 on either side of the load. If the load is narrower than shown, side rails 10 and 12 can be positioned closer together so as to prevent lateral movement of the load. Arms 18, 20, 22 and 24 can be extended further such that they still bear against side walls 94 and 96.

Since side rails 10 and 12 do not utilize any springs or other biasing means to retain them in position, tailgate 98 may be lowered with the cargo brace installed without any danger of side rails 10 or 12 "springing out" beyond the limits of the truck bed.

The cargo brace can be easily removed by retracting arms 18, 20, 22, and 24 to their innermost position; folding the center of lateral members 14 and 16 inwardly; bringing side rails 10 and 12 together in a parallel fashion; and retracting and folding legs 26, 28, 30 and 32 into side rails 10 and 12. The folded cargo brace is shown in FIG. 3 and may be easily carried or stored.

The foregoing description of the particular embodiment is to be considered illustrative and not limiting in any fashion.

I claim:

1. A cargo brace for retaining a cargo load in a cargo area comprising
   (a) bracing means for contacting at least two walls of said cargo area to secure said cargo brace within said cargo area comprising a pair of side rails disposed in generally parallel fashion for preventing cargo from contacting oppositely disposed side walls of said cargo area, and a pair of lateral members interconnecting said pair of side rails for spacing said side rails from each other and for preventing cargo from contacting oppositely disposed end walls of said cargo area, and
   (b) a plurality of support legs attached to said bracing means for bearing against a floor of said cargo area to support said bracing means above the floor and to secure the cargo brace within the cargo area.

2. The cargo brace of claim 1 wherein said pair of side rails are each longitudinally adjustable so as to vary their length and further comprising first locking means to lock said rails in a desired adjusted length.

3. The cargo brace of claim 2 further comprising means to allow said lateral members to be folded such that when they are folded said pair of side rails are adjacent each other.

4. The cargo brace of claim 3 further comprising a lateral arm slidably attached to each end of said lateral members, the lateral arms being extendible to contact oppositely disposed walls of said cargo area, and second locking means to lock said lateral arms in their extended positions.

5. The cargo brace of claim 2 wherein said pair of side rails each comprise first and second channel members sized such that said first channel member telescopically fits within said second channel member.

6. The cargo brace of claim 5 wherein said first locking means comprises a manually operable pawl attached to said second channel member and extending through an opening therein, said pawl engaging one of a plurality of openings in said first channel member to lock the first and second channel members in position.

7. The cargo brace of claim 6 wherein said second locking means comprises a manually operable pawl attached to each of said lateral arms and extending through an opening therethrough so as to engage one of a plurality of openings in said lateral members.

8. The cargo brace of claim 7 wherein said support legs each comprise first and second portions slidably attached to each other and third locking means to lock said first and second portions in a desired position.

9. The cargo brace of claim 8 wherein said third locking means comprises a manually operable pawl attached to said first portion and extending through an opening therein so as to engage one of a plurality of openings in said second portion.

10. The cargo brace of claim 8 wherein each of said support legs are pivotably attached to said side rails and movable between a folded and an extended position.

11. The cargo brace of claim 10 wherein means are provided to retain said supporting legs in said folded and extended positions.

12. The cargo brace of claim 11 wherein said retaining means comprises:
    (a) a first washer attached to said side rail, said first washer having first and second radial detent portions disposed at approximately a right angle from one another; and
    (b) a second washer attached to said support leg and bearing against said first washer, said second washer having a detent portion for engagement with the first and second detent portions of said first washer.

* * * * *